United States Patent [19]

Sallas et al.

[11] Patent Number: 5,126,980
[45] Date of Patent: * Jun. 30, 1992

[54] SELF-ORIENTING VERTICALLY SENSITIVE ACCELEROMETER

[75] Inventors: John J. Sallas; Jack G. Clemens, both of Plano, Tex.

[73] Assignee: Halliburton Geophysical Services, Inc., Houston, Tex.

[ * ] Notice: The portion of the term of this patent subsequent to Sep. 3, 2008 has been disclaimed.

[21] Appl. No.: 646,967

[22] Filed: Jan. 28, 1991

Related U.S. Application Data

[63] Continuation of Ser. No. 533,656, Jun. 5, 1990, Pat. No. 5,046,056.

[51] Int. Cl.⁵ .................. H04R 17/00; G01P 15/09
[52] U.S. Cl. .................. 367/178; 367/166; 367/171; 367/180; 310/800
[58] Field of Search ............. 367/178, 180, 166, 188, 367/171; 310/800, 324, 329

[56] References Cited

U.S. PATENT DOCUMENTS

| | | | |
|---|---|---|---|
| 4,345,473 | 8/1982 | Berni | 367/166 |
| 4,354,134 | 10/1982 | Micheron | 310/800 |
| 4,624,140 | 11/1986 | Ekchian et al. | 73/653 |
| 4,805,157 | 2/1989 | Ricketts | 310/800 |

OTHER PUBLICATIONS

"Ferroelectric Ceramics vs Polymer Piezoelectric Materials," Lancee et al., *Ultrasonics,* May 1985.

*Primary Examiner*—Ian J. Lobo

[57] ABSTRACT

A self-orienting vertically sensitive accelerometer is disclosed for measuring a vertical component of acceleration independently of the orientation of the accelerometer. The accelerometer of the present invention includes a spherical plastic shell having a plurality of perforations disposed therein and a thin film of metallic coated piezoelectric polymer bonded to the exterior thereof, forming a small diaphragm at each perforation. In response to acceleration a dynamic pressure is developed within a fluid mass partially filling the spherical plastic shell which creates a strain and resultant charge in each small diaphragm of piezoelectric polymer. The vast difference in density between the fluid mass and the air in the remaining volume of the spherical plastic shell permits the charge developed in each small diaphragm under fluid pressure to be attributed solely to the vertical component of acceleration applied to the fluid mass. In a preferred embodiment of the present invention the self-orienting vertically sensitive accelerometer is mounted within a low density open cell foam and utilized within a marine seismic streamer wherein orientation of each accelerometer is not easily controlled.

15 Claims, 1 Drawing Sheet

SELF-ORIENTING VERTICALLY SENSITIVE ACCELEROMETER

This is a continuation of application Ser. No. 533,656, filed Jun. 5, 1990, now U.S. Pat. No. 5,046,056.

BACKGROUND OF THE INVENTION

1. Field of the Invention

The present invention relates in general to the field of accelerometers and in particular to the field of vertically sensitive accelerometers. Still more particularly the present invention relates to self-orienting vertically sensitive accelerometers useful for measuring a vertical component of acceleration independently of the orientation of the accelerometer.

2. Description of the Prior Art

Offshore seismic exploration typically employs elongate marine streamer cables in tow behind an exploration vessel. Such streamers typically contain hydrophones, or transducers which are responsive to variations in pressure. Each streamer is generally fluid-filled to provide a medium for sensor coupling. The hydrophones are utilized as receivers for reflected seismic waves which are generated by a seismic source, such as air gun array. The ability to simultaneously record vertical particle motion and pressure has long been recognized as a method for improving signal to noise ratio in seismic recording. For example, see U.S. Pat. No. 2,757,356, issued Jul. 31, 1956 entitled *Method and Apparatus for Cancelling Reverberations In Water Layers* or U.S. Pat. No. 4,486,865; issued Dec. 4, 1984, entitled *Pressure and Velocity Detectors For Seismic Exploration.*

One problem which exists in marine seismic exploration involves so-called ghosts or spectral notches which are generated as up-going seismic energy is reflected from the water/air interface at the surface of a body of water. The reflection coefficient at the surface is nearly unity in magnitude and negative in sign. Therefore, when hydrophones are positioned at integer wave lengths in depth, a notch in the power spectrum will occur at the corresponding frequency as the upward energy is cancelled by the reflected energy from the water/air interface.

For particle velocity however the reflection coefficient is positive at the water/air boundary. Notches will therefore appear in a particle velocity amplitude spectrum when the hydrophones are positioned at half wave lengths in depth. By utilizing the fluid particle velocity in addition to the dynamic fluid pressure, separation of the up-going and down-going wave fronts may be achieved. Addition of the pressure and velocity measurements, scaled by the acoustic impedance of the fluid in which the transducers are immersed will generally yield spectra free of ghosts and deep spectral notches.

It is generally known that an accelerometer may be utilized in such applications, rather than a velocity transducer. The acceleration signal is then either electrically or numerically integrated to convert this signal to a signal which is representative of particle velocity. It is important that the accelerometers employed in such applications be insensitive to dynamic pressure changes in order to achieve maximum separation of the up-going wave front from the down-going wave front.

Proper orientation of an accelerometer or geophone axis in a marine streamer is non-trivial. Exploration streamers towed behind marine vessels are typically over one mile in length. Modern marine streamers may utilize in excess of 10,000 transducers. In order to maintain each accelerometer in a proper orientation to detect the vertical component of acceleration, the prior art has proposed various solutions. For example, the use of gimbals has been proposed repeatedly. Gimbaling generally requires the utilization of expensive bearings and commutators however and has not generally been successful. U.S. Pat. No. 4,618,949, issued Oct. 21, 1986, entitled *Self-Orienting Directionaly Sensitive Geophone,* proposes a solution which utilizes a ferromagnetic fluid as a suspension means for a magnet, thereby permitting rotation of the device while maintaining vertical sensitivity. However, the aforementioned patent does not address the problem which occurs in a marine streamer which is not horizontally disposed.

U.S. Pat. No. 4,345,473, issued Aug. 24, 1982, entitled *Vertical Component Accelerometer,* offers a solution which includes concentric spheres or cylinders which are lined with piezoelectric ceramic material. The gap between the inner and outer shells is then partially filled with a conductive fluid. The interconnection and polarization of the inner and outer piezoelectric layers is then utilized to cause the pressure sensitivity of this device cancel. However, the fact that this device utilizes piezoelectric material in a compressional mode means that the device is fairly insensitive when compared to a device which utilizes piezoelectric material in a bending mode. To achieve a sufficiently high sensitivity to be of utilization in detecting seismic signals the apparatus proposed in U.S. Pat. No. 4,345,473 would require a device of such a large diameter so as to be impractical in modern small-diameter marine streamers. The utilization of a piezoelectric material in a compressional mode, as disclosed in U.S. Pat. No. 4,345,473, would mean that for a sphere of moderate size (approximately one inch in diameter) the noise floor of a typical charge amplifier would be much greater than the signal levels this device could generate when excited by a seismic wave from a moderate depth reflector. For this reason, piezoelectric hydrophones in current use operate with thin ceramic materials in a bending mode to achieve a sufficiently high sensitivity.

U.S. Pat. No. 4,789,971, issued Dec. 6, 1988, entitled *Broad Band, Acoustically Transparent, Non-Resonant PVDF Hydrophone,* teaches the utilization of a piezoelectric polymer film of polyvinylidene fluoride (PVDF) which may be operated in a tension mode to create a device having sufficiently high sensitivity.

Those skilled in the art will appreciate that in land seismic surveys thousands of geophones are typically deployed for each survey. Each geophone is manually planted into the ground and rapid deployment is necessary for low cost operation. Therefore, care is not always taken to ensure that all seismometers are vertically oriented. Although most geophones in current use are of the moving coil type wherein a tilt of less than 15° is of minor consequence, larger angles may cause decreased sensitivity due to coil drag. Therefore, a self-orienting vertical seismometer would be of value for land applications as well.

SUMMARY OF THE INVENTION

It is therefore one object of the present invention to provide an improved accelerometer.

It is another object of the present invention to provide an improved vertically sensitive accelerometer.

It is still another object of the present invention to provide a self-orienting vertically sensitive accelerometer useful for measurement of a vertical component of acceleration independently of the orientation of the accelerometer.

The foregoing objects are achieved as is now described. The accelerometer of the present invention includes a spherical plastic shell having a plurality of perforations disposed therein and a thin film of metallic coated piezoelectric polymer bonded to the exterior thereof, forming a small diaphragm at each perforation. In response to acceleration a dynamic pressure is developed within a fluid mass partially filling the spherical plastic shell, which creates a strain and resultant charge in each small diaphragm of piezoelectric polymer. The vast difference in density between the fluid mass and the air in the remaining volume of the spherical plastic shell permits the charge developed in each small diaphragm under fluid pressure to be summed and attributed solely to the vertical component of acceleration applied to the fluid mass. In a preferred embodiment of the present invention the self-orienting vertically sensitive accelerometer may be utilized within a marine seismic streamer wherein orientation of each accelerometer is not easily controlled.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawing, wherein:

DETAILED DESCRIPTION OF THE INVENTION

Figure 1:
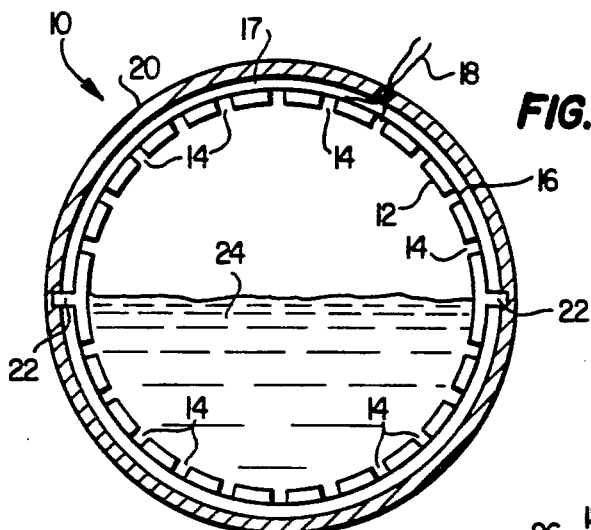
FIG. 1 is a sectional view of a sensing element which may be utilized with the self-orienting vertically sensitive accelerometer of the present invention.

With reference now to the figures and in particular with reference to FIG. 1, there is depicted a sectional view of a sensing element which may be utilized with the self-orienting vertically sensitive accelerometer of the present invention. As may be seen, sensing element 10 is constructed utilizing an inner spherical shell 12 which includes a plurality of circular perforations 14 which are disposed, in a preferred embodiment of the present invention, in a uniform distribution over the surface of inner spherical shell 12.

Bonded to the exterior surface of inner spherical shell 12 is a thin film 16 of a piezoelectric polymer, such as polyvinylidene fluoride (PVDF). Such films are commercially available and an excellent example is marketed by Penwalt under the trademark "KYNAR." Thin film 16 is preferably between six and ten micrometers in thickness and includes a conductive metallic film on each side thereof. A pair of electrical leads 18 are attached to each side of thin film 16 and are utilized to couple the piezoelectric output of thin film 16 to an appropriate sensing/amplification circuit. Those skilled in the art will appreciate that thin film 16 may also be bonded to the interior surface of inner spherical shell 12.

A hermetically sealed outer spherical shell 20 is also provided and is mounted concentrically about inner spherical shell 12 by means of mechanical connections 22. Outer spherical shell 20 provides an air gap 17 between its inner surface and the outer surface of inner spherical shell 12 and preferably serves as a pressure vessel which is mechanically coupled to inner spherical shell 12 to permit transmission of motion. Outer spherical shell 20 need not be perfectly concentric within inner spherical shell 12 in order to function in this manner. A mass load is provided by a fluid mass 24 which preferably occupies approximately one-half of the inner volume of inner spherical shell 12.

Fluid mass 24 preferably comprises silicon oil or a water/anti-freeze mix and is selected in a marine application to achieve neutral buoyancy of sensing element 10. The remaining volume of inner spherical shell 12 is preferably air filled. Therefore, as sensing element 10 undergoes acceleration, a dynamic pressure is developed within fluid mass 24. This pressure is equal to the product of the acceleration and the mass of fluid mass 24 divided by the area of the inner surface of inner spherical shell 12 which is in contact with fluid mass 24.

In the manner described above, any resultant pressure within fluid mass 24 will be transferred to the large number of small diaphragms formed by thin film 16 at each perforation 14 which is in contact with fluid mass 24. For purposes of this specification it will be assumed that the output of thin film 16 is a charge, although piezoelectric products having voltage outputs may be utilized. Thus, the pressure applied to each of these diaphragms will create a strain and a resultant charge in each diaphragm. Those skilled in the art will appreciate that in the upper hemisphere of inner spherical shell 12 a slight charge of opposite sign will be created. Due to the vast difference in density between fluid mass 24 and the air in the upper hemisphere, this opposite sign charge will be approximately one thousandths of the charge imparted by fluid mass 24. Therefore, it may be assumed that the total charge output of sensing element 10 is the sum of the charges developed at each small diaphragm in contact with fluid mass 24.

The piezoelectric polymer utilized in the present invention, according to the manufacturer, has static piezoelectric strain coefficients of $d31 = 20–25\ pC/N;$ and $d33 = 20–22\ pC/N.$ When bonded across a circular orifice to form a diaphragm, thin film 16, when exposed to a uniform pressure "P" would develop a strain within the material of approximately:

$$.423 * E^{\frac{1}{2}} * \left| \frac{P * r}{t} \right|^{\frac{3}{2}}$$

at the center of each diaphragm and, $$.328 * E^{\frac{1}{3}} * \left| \frac{p * r}{t} \right|^{\frac{2}{3}}$$

at the edge of each diaphragm; where:
r = the radius of the diaphragm;
t = the thickness of the diaphragm; and
E = Young's modulus of elasticity for PVDF.

These formulas are from "Formulas for Stress and Strain" by Raymond J. Roarks, McGraw-Hill, 1965, pp. 247.

Thus, the charge developed by each diaphragm is approximately equal to the product of d31, the diaphragm area and the average strain in the material. In this manner, for small pressure perturbations about a hydrostatic pressure, the change in strain for small changes in pressure may be closely approximated by a linear equation. For such small perturbations the resultant change in charge is directly proportional to the dynamic component of pressure.

Sensing element 10, when constructed in accordance with the present invention, wi 11 produce an output on the order of $3\mu$ C/G when the inner spherical shell has a diameter of two centimeters and thin film 16 is approximately ten micrometers in thickness. Electrical leads 18 will then couple this output to an appropriate electronic amplifier (not shown). Tn a preferred embodiment of the present invention, inner spherical shell 12 is preferably constructed of a high impact plastic. However, those skilled in the art will appreciate that while the fabrication would be more difficult it would also be possible to construct inner spherical shell 12 of a metallic conductive material.

Figure 2:
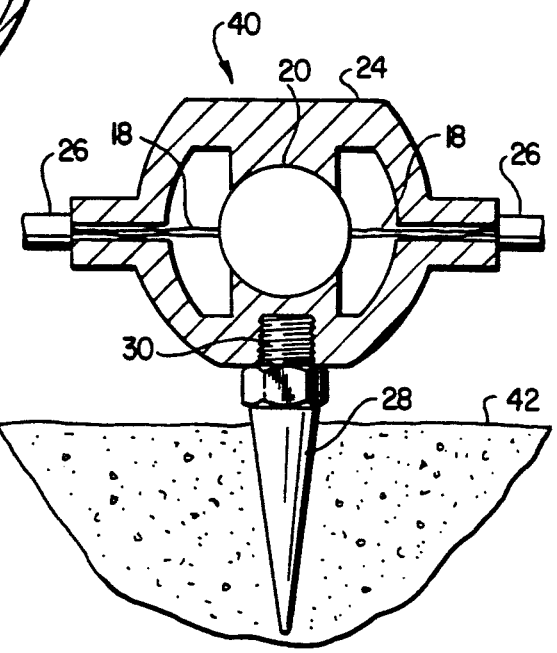
FIG. 2 is a sectional view of land accelerometer employing the novel self-orienting vertically sensitive accelerometer of the present invention.

Referring now to FIG. 2, there is depicted a sectional view of a land accelerometer 40. As may be seen, land accelerometer 40 includes an accelerometer case 24, which is preferably constructed of plastic or other suitable rigid material. Outer spherical shell 20 is mounted in direct mechanical connection to accelerometer case 24 such that motion of the accelerometer case will be directly coupled to the sensing element therein. This may be seen, electrical leads 18 are coupled to and from outer spherical shell 20 and in or out through a wire Connection 26 such that multiple land accelerometers 40 may be connected together in the manner well known in the art.

Also mounted to land accelerometer 40 is a mounting spike 28 which is preferably threaded at one end into a threaded aperture 30 of accelerometer case 24. Thus, when land accelerometer 40 is inserted into the surface of the earth 42, seismic vibrations within the earth's surface will be mechanically coupled via spike 28 into accelerometer case 24 to be mechanically coupled to sensing element 10 within outer spherical shell 20. As discussed herein, most moving coil accelerometers are relatively insensitive to misalignments from vertical; however, a misalignment in access of approximately 15° may result in coil drag and reduced sensitivity. By utilizing sensing element 10 of the present invention and the properties of fluid mass 24, those skilled in the art will appreciate that the charge output from sensing element 10 will directly reflect the vertical component of acceleration experienced by land accelerometer 40 without regard to the orientation of accelerometer case 24.

Figure 3:
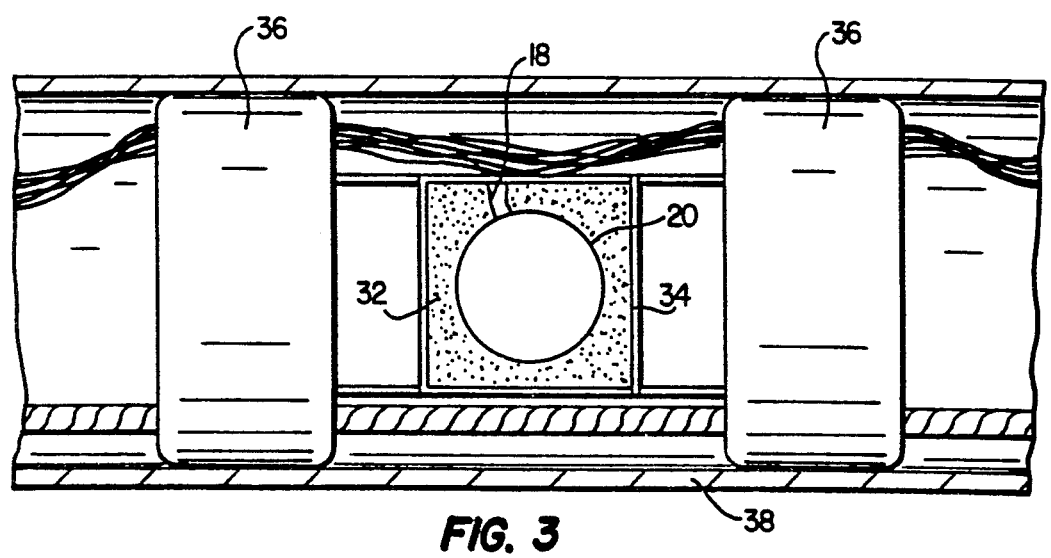
FIG. 3 is a sectional view of a portion of a marine streamer employing the novel self-orienting vertically sensitive accelerometer of the present invention.

With reference now to FIG. 3, there is depicted a sectional view of a portion of a marine streamer 38 which employs the novel self-orienting vertically sensitive accelerometer of the present invention. As may be seen, outer spherical shell 20 is preferably mounted within a volume of low density open cell polyurethane foam 32. Foam 32 will vibrationaly isolate sensing element 10 from surrounding cage 34 and electrical leads 18 at frequencies which are below the seismic frequencies of interest. When immersed in the marine streamer coupling fluid low density open cell polyurethane foam 32 will become saturated and behave acoustically very much like the surrounding fluid. Spacers 36 may be utilized, in a manner well known in the art, to isolate and mount a plurality of sensing elements 10 along the length of marine streamer 38. When constructed in the manner illustrated in FIG. 3, a marine streamer will be effectively isolated from noise generated by moving streamer wire bundles and is strictly fluid-coupled for the frequencies of interest.

As discussed above, it is necessary in a marine environment to construct a transducer in accordance with the present invention such that the transducer is neutrally buoyant. Neutral buoyancy will guarantee that the device is fluid coupled. By knowing the device sensitivity and the specific acoustic impedance of the liquid in which the device is immersed, the output of individual sensing elements within a marine streamer constructed in accordance with the method of the present invention may be combined with the output of an adjacent hydrophone of known sensitivity to eliminate the effects of reverberations by isolating the up-going signal from the down-going signal.

Upon reference to the foregoing specification, those skilled in the art will appreciate that the Applicants have provided a novel vertically sensitive accelerometer which will unerringly generate an output which is proportional to the vertical component of acceleration experienced by the accelerometer without regard to the physical orientation of the accelerometer. By utilizing a fluid mass to detect acceleration the fluid in question will always settle into the lower hemisphere of inner spherical shell 12, thus ensuring that only the vertical component of acceleration will be detected.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A self-orienting seismometer comprising:
    a first shell having at least one perforation thereon;
    a thin film of piezoelectric polymer bonded to said first shell wherein a portion of the thin film overlies at least one perforation forming a diaphragm;
    a fluid substance disposed within said first shell and in contact with said diaphragm and;
    means for detecting a vertical component of acceleration applied to said seismometer including means coupled to said thin film of piezoelectric polymer for detecting an output from said thin film in response to pressure applied to said diaphragm by said fluid substance.

2. The self-orienting seismometer according to claim 1 wherein the first shell includes a plurality of perforations thereon, and wherein the thin film overlies a plurality of perforations forming respective diaphragms, and wherein the fluid substance is in contact with a plurality of diaphragms.

3. The self-orienting seismometer according to claim 1 wherein each perforation is circular and uniformly distributed about said first shell.

4. The self-orienting seismometer according to claim 1 wherein said thin film of piezoelectric polymer comprises a thin film of polyvinylidene fluoride (PVDF).

5. The self-orienting seismometer according to claim 1 wherein said thin film of piezoelectric polymer is between six and ten micrometers in thickness.

6. The self-orienting seismometer according to claim 1 wherein said fluid substance comprises a mixture of water and alcohol.

7. The self-orienting seismometer according to claim 1 further comprising a second shell mounted around said first shell and coupled to said first shell.

8. The self-orienting seismometer according to claim 7 further comprising a mounting spike coupled to said second shell.

9. The self-orienting seismometer according to claim 7 further comprising means for suspending said second shell within a marine streamer wherein said second shell may be immersed within fluid.

10. A method for measuring a vertical component of acceleration comprising:
bonding a thin film of piezoelectric polymer to a shell wherein the shell has portions thereon defining a perforation and wherein a diaphragm is formed by a portion of the thin film overlying the perforated portion of the shell;
contacting said diaphragm with a fluid substance;
applying a vertical component of acceleration to the shell; and
detecting the output from said thin film in response to pressure applied to said diaphragm by said fluid substance.

11. The method of claim 10 wherein the shell is further defined as having plurality of perforations thereon and wherein a plurality of diaphragms are formed by the thin film overlying a plurality of perforations.

12. The method of claim 11 wherein the fluid substance is in contact with a plurality of diaphragms.

13. The method of claim 12 wherein the output is detected from said thin film in response to pressure applied to the plurality of diaphragms in contact with said fluid substance.

14. The method of claim 10 wherein the fluid substance is disposed within said shell.

15. The method of claim 10 wherein the fluid substance occupies a fraction of the volume within said shell.

* * * * *